United States Patent
Brogan et al.

[11] Patent Number: 6,012,634
[45] Date of Patent: *Jan. 11, 2000

[54] DUAL CARD AND METHOD THEREFOR

[75] Inventors: Hugh Brogan, Grayslake; David Craig Schuster, Buffalo Grove; Rafaele Pini, Norridge, all of Ill.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/399,689

[22] Filed: Mar. 6, 1995

[51] Int. Cl.$^7$ ...................................................... H04Q 7/32
[52] U.S. Cl. .......................... 235/380; 455/557; 455/558; 455/407
[58] Field of Search ................................ 379/58, 59, 355, 379/357, 144; 455/33.1, 558, 557, 550, 406–407; 235/486, 492, 379, 380; 375/222; 439/64

[56] References Cited

U.S. PATENT DOCUMENTS

| | | | |
|---|---|---|---|
| 4,837,814 | 6/1989 | Yoshino et al. | |
| 4,960,982 | 10/1990 | Takahira | 235/492 X |
| 5,214,637 | 5/1993 | Sridhar et al. | 375/222 X |
| 5,266,782 | 11/1993 | Alanara et al. | 379/144 X |
| 5,325,429 | 6/1994 | Kurgan | |
| 5,353,328 | 10/1994 | Jokimies | 379/58 |
| 5,359,182 | 10/1994 | Schilling | 379/61 X |
| 5,371,493 | 12/1994 | Sharpe et al. | 379/357 |
| 5,404,580 | 4/1995 | Simpson et al. | 379/357 X |
| 5,445,525 | 8/1995 | Broadbent et al. | 439/64 |
| 5,500,517 | 3/1996 | Cagliostro | 235/486 |
| 5,594,233 | 1/1997 | Kenneth et al. | 235/492 |

FOREIGN PATENT DOCUMENTS

| | | |
|---|---|---|
| 646892A2 | 4/1995 | European Pat. Off. |
| 2285558 | 7/1995 | United Kingdom |
| 92/19078 | 10/1992 | WIPO |
| 95/27955 | 10/1995 | WIPO |

OTHER PUBLICATIONS

ITT ElectroMechanical Component Worldwide. Brochure containing their range of Smart Card Connectors.
Amphenol Industrial Technology Division. Brochure containing various chip card readers.
Amphenol Industrial Technology Division. Catalogue containing Amphenol's range of chip card readers.

*Primary Examiner*—William G. Trost
*Attorney, Agent, or Firm*—Randall S. Vaas

[57] ABSTRACT

A smart memory card (400, 900, 1000) communicates with a smartcard compatible device (500) and a memory card compatible device (600). The smart memory card includes a processor (402, 902, 1002) which performs smartcard functions and a memory (412, 912, 1004) for use with a memory card device connection which allows memory card compatible device operation. Cellular telephones (1300, 1600) facilitate the use of two types of cards therein.

7 Claims, 9 Drawing Sheets

DUAL CARD AND METHOD THEREFOR

FIELD OF THE INVENTION

The present invention pertains to cards, and more particularly to portable information cards.

BACKGROUND OF THE INVENTION

Figure 1:
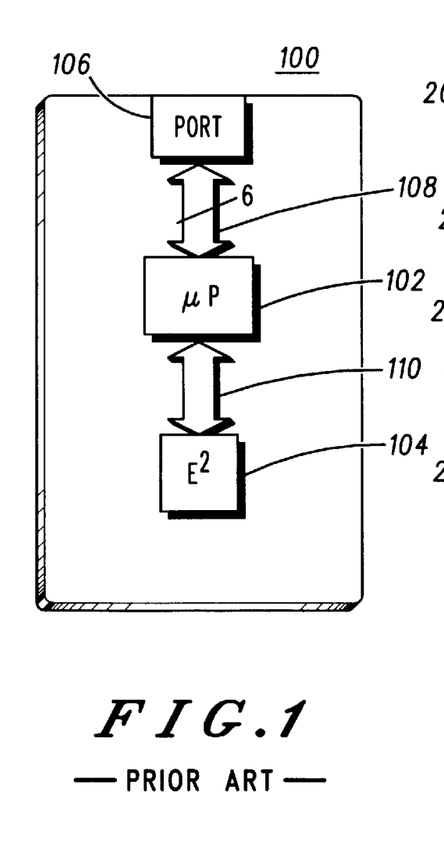
FIG. 1 is a schematic illustration of a prior art smartcard.
Figure 2:
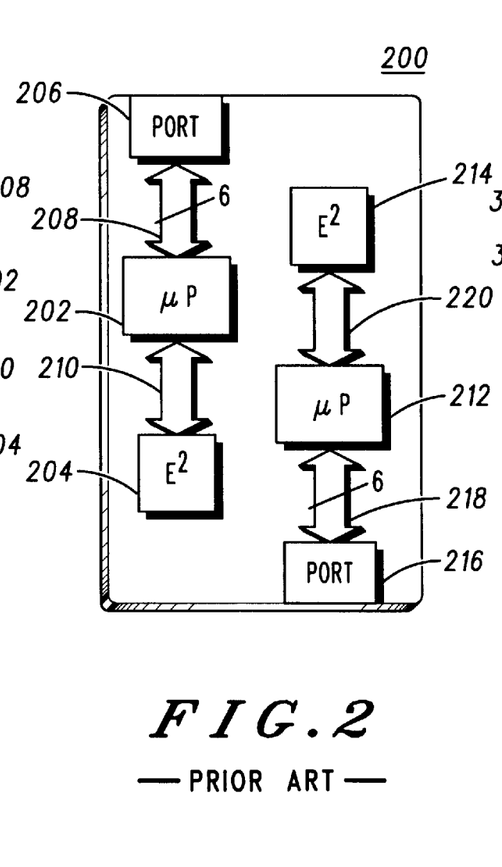
FIG. 2 is a schematic illustration of another prior art smartcard.

A variety of electronic cards are utilized to transport information. For example, smartcards 100 (FIG. 1) are used with cellular telephones to provide subscriber identification information to a cellular telephone. Smartcards include a microprocessor 102 and an electronically erasable programmable read only memory (EEPROM) 104. The microprocessor communicates with a port 106 through a communication bus 108 and memory 104 via data bus 110. The EEPROM stores information, such as an account identification, communicated to the cellular telephone when the smartcard is inserted into the cellular telephone. Another smartcard device 200 is illustrated in FIG. 2. This smartcard includes a first microprocessor 202 coupled to an EEPROM 204 and a port 206. Microprocessor 202 is connected to port 206 vi a bus 208 and to EEPROM 204 via data bus 210. A second microprocessor 212 is coupled to an EEPROM 214 and a port 216. The microprocessor 212 and EEPROM 214 are connected by a data bus 220. Microprocessor 212 is connected to port 216 via bus 218. EEPROMs 204 and 214 store respective information for different accounts. Thus, one EEPROM can be associated with a holder's personal account and the other EEPROM can be associated with the holder's business account.

Figure 3:
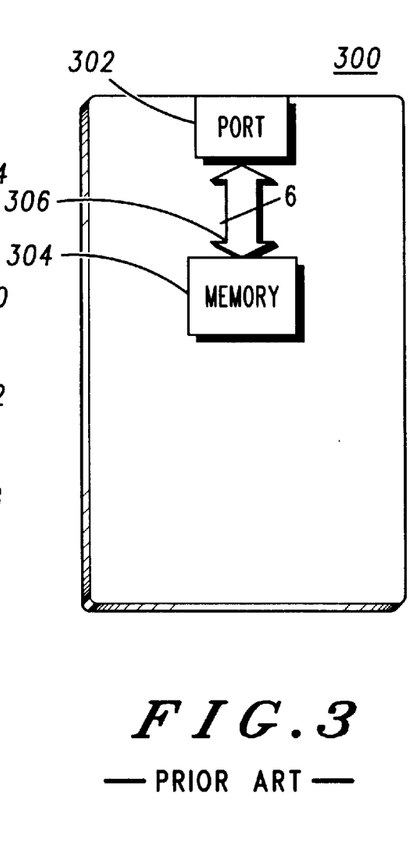
FIG. 3 is a schematic illustrating of a prior art memory card.

A memory card 300 (FIG. 3) includes a port 302 and a memory 304 coupled by a data bus 306. The memory stores an account balance which is credited or debited when the memory card 300 is coupled to a memory card compatible device. For example, the memory card is used for pay phone, banking, cinema, and mass transit applications.

Because smartcards 100, 200 and memory cards 300 employ different communication signal formats, and store different information, these cards can not be used interchangeably. For example, memory card 300 employees synchronous communication whereas smartcards 100 and 200 utilize asynchronous communication.

Accordingly, there is a need for devices and information cards which are more versatile.

2

DETAILED DESCRIPTION OF THE DRAWINGS

A dual card, also referred to herein as a smart memory card, communicates with a smartcard compatible device and a memory card compatible device. The smart memory card includes a processor which performs smartcard functions and a memory device connection which allows memory card compatible device performance. The smart memory card is advantageous in that it allows users to have single card which may be used as both a memory card and a smartcard. The memory card account balance can be updated via a cellular telephone, such that a user does not have to find a credit machine to increase the account balance. The smart memory cards has more memory than a conventional memory device. This allows more updatable features to be loaded into the card and facilitates updating of telephone features in the telephone.

Figure 4:
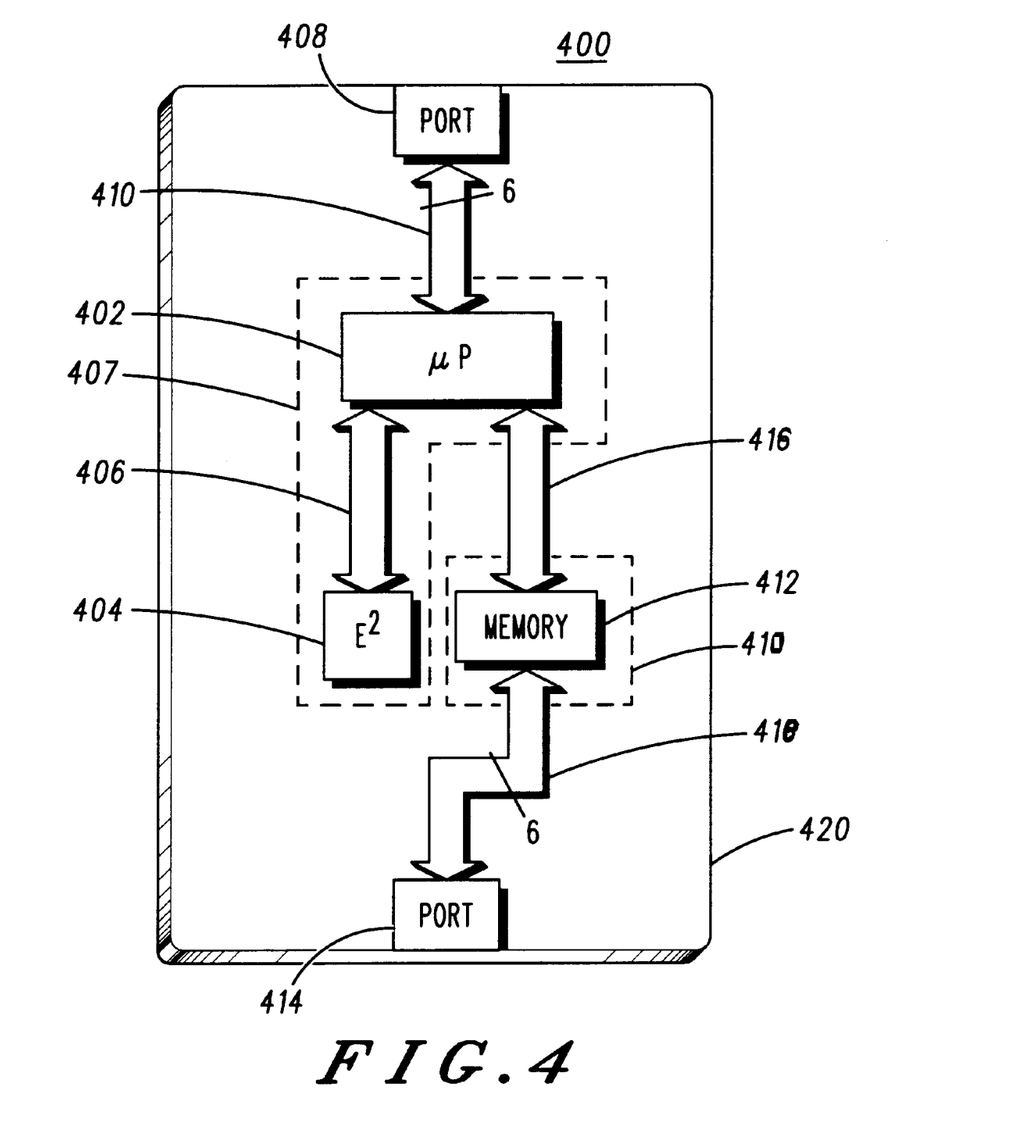
FIG. 4 is schematic illustration of a smart memory card.

A smart memory card 400 (FIG. 4) includes a smartcard device 407 having a processor 402 and an EEPROM 404. The processor may be implemented using any suitable device, such as a commercially available microprocessor. The processor and EEPROM are connected by a data bus 406. The processor 402 is connected to a port 408 via data bus 410. Port 408 is for connection to a smartcard compatible device, such as a cellular telephone. The processor 402, EEPROM 404, data bus 406, port 408, and data bus 410, comprise the smartcard components. The EEPROM is a memory. The smart memory card memory device 411 comprises a memory 412 coupled to a port 414 via a bus 416. Port 414 is for connection to a memory card compatible device. The memory 412, port 414, and bus 416 comprise a memory card. The memory 412 is also coupled to processor 402 via a data bus 418. This bus allows the memory card to be available to a smart card compatible device coupled to the port 408. The smart memory card components are embedded in a dielectric material 420 providing a substantially rigid body for the smartcard.

Figure 5:
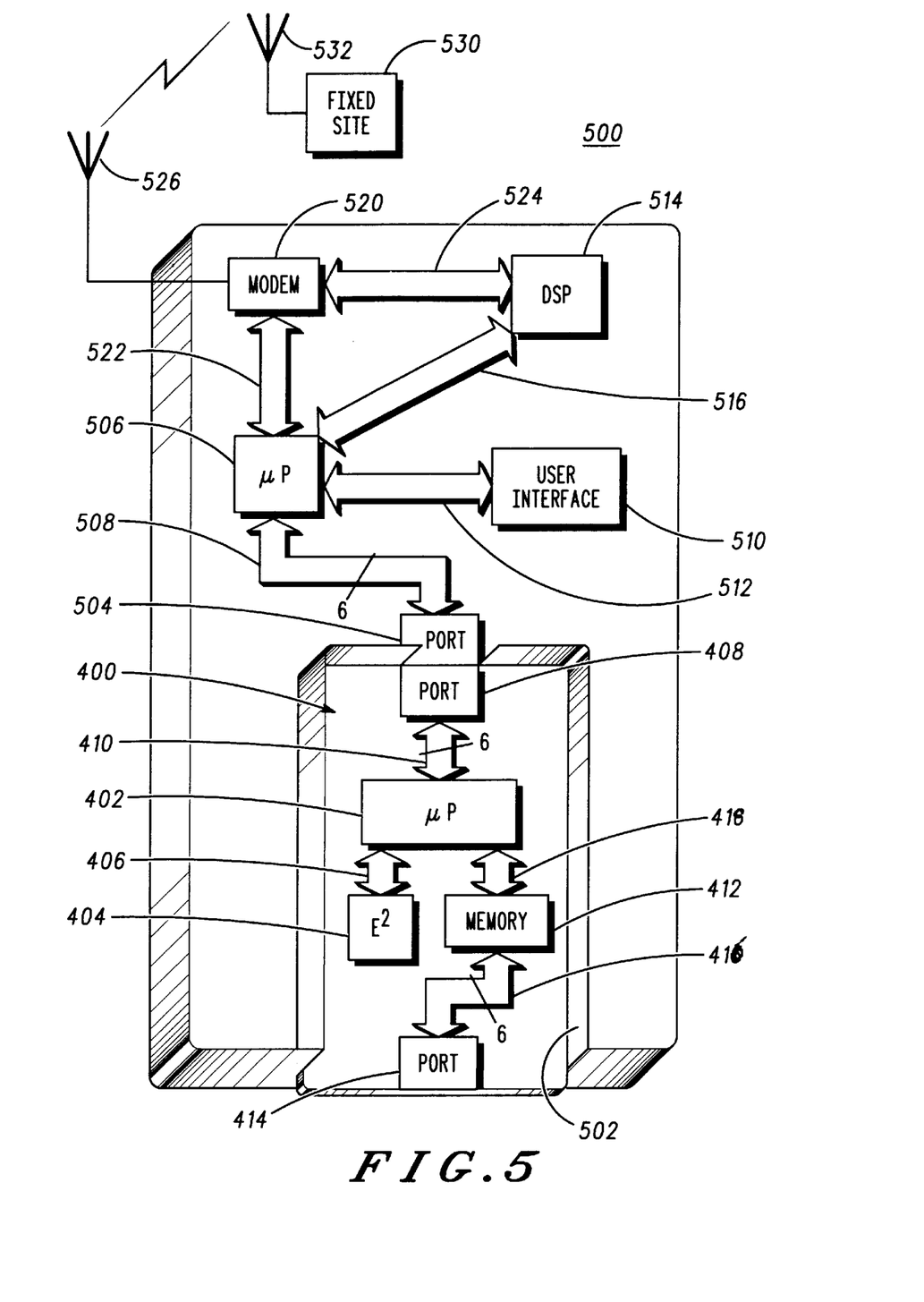
FIG. 5 is a schematic circuit diagram of a smart memory card coupled to a cellular telephone.

The connection of smart memory card 400 to a cellular telephone 500 is illustrated in FIG. 5 The cellular telephone includes a receptacle 502 for receipt of the smart memory card 400. A port 504 associated with the receptacle 502 is positioned in the cellular telephone such that it contacts port 408. Port 408 is positioned on smart memory card 400 at the standard mounting location of smartcard ports. Thus conventional smartcards and the smart memory cards can both be used in the cellular telephone 500. Port 504 is connected to a processor 506 via a bus 508. The processor controls operation of the cellular telephone 500. The microprocessor is coupled to a user interface 510 via a data bus 512, a digital signal processor (DSP) 514 via a data bus 516, and MODEM 520 via bus 522. MODEM 520 is coupled to a DSP 514 via a data bus 524 and to antenna 526. MODEM 520 modulates signals to be transmitted to a fixed site 530 and demodulates signals received from fixed site 530. Signals are communicated between the cellular telephone and the fixed site via antennas 526 and 532.

Figure 6:
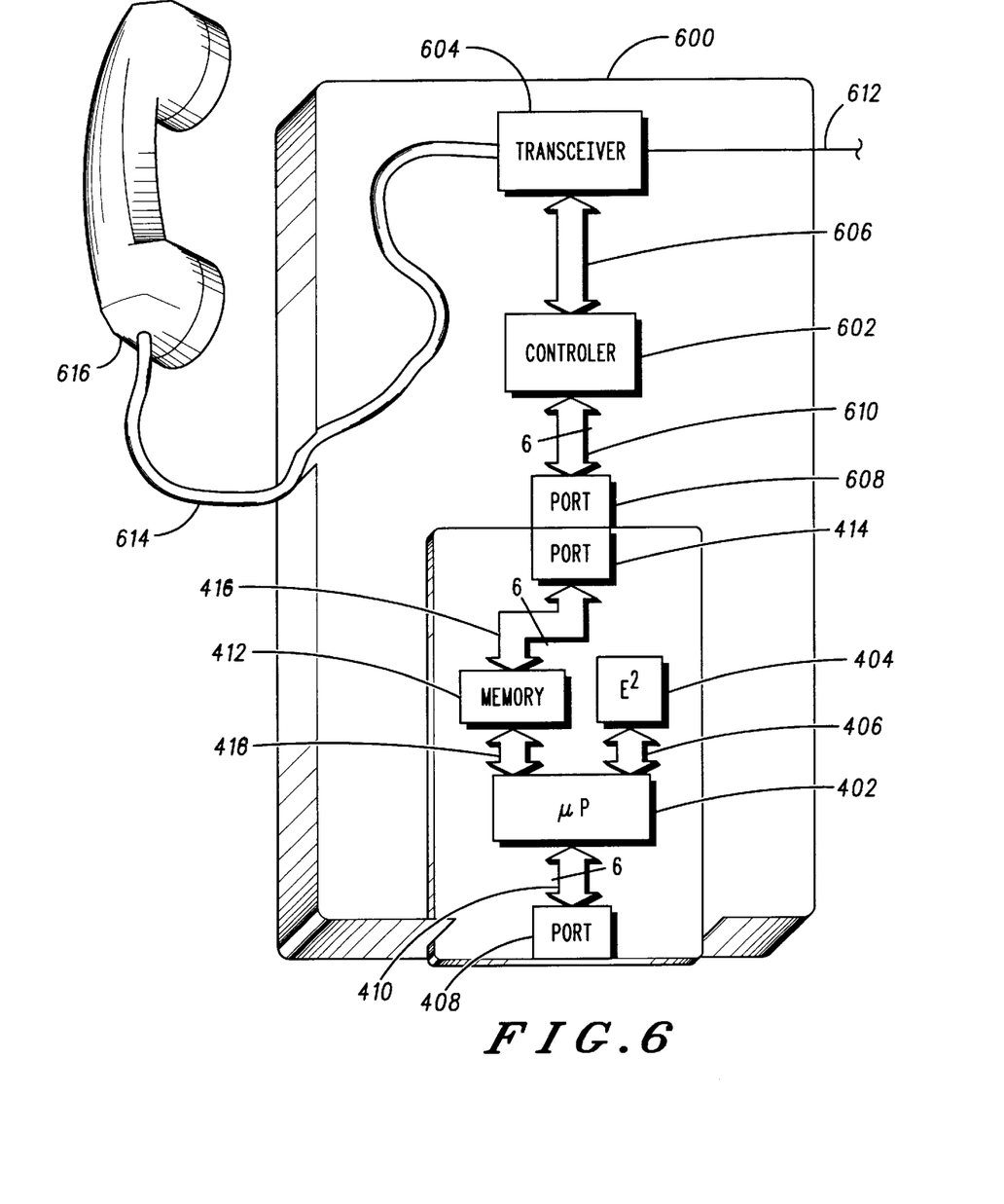
FIG. 6 is a schematic diagram of a smart memory card coupled to a pay telephone.

The smart memory card 400 can also be utilized with a memory card compatible device, such as a pay phone 600 in FIG. 6. The pay phone includes a transceiver 604 connected to a landline 612 and a cord 614 associated with handset 616. The transceiver is connected to a controller 602 via a data bus 606. Controller 602 is also connected to port 608 via data bus 610. Port 608 is for connection to port 414 of smart memory card 400. Although the memory card is illustrated in a pay phone, memory card compatible device applications include banking, cinema, vending and mass transit.

Figure 7:
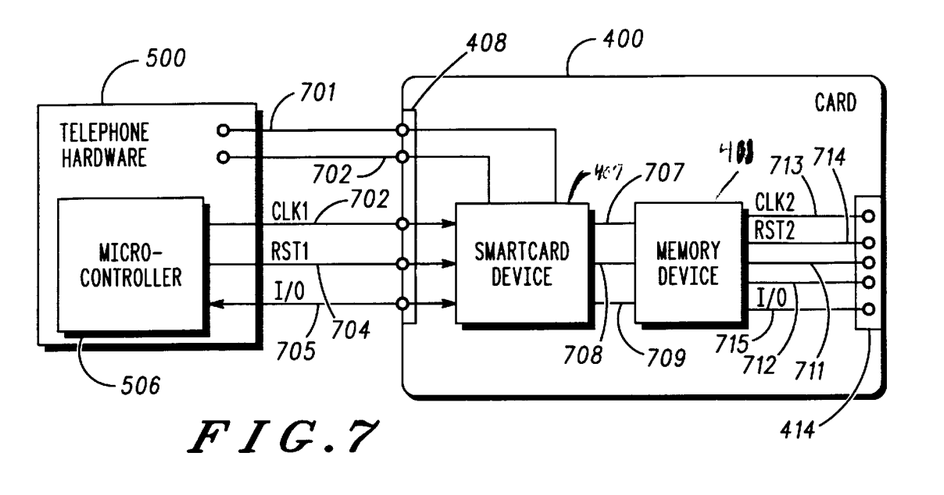
FIG. 7 is a circuit schematic illustrating a cellular telephone and smart memory card which are interconnected.

The interconnection of the smart memory card 400 and the cellular telephone 500 includes five conductors 701–705 (FIG. 7). Conductor 701 is a power regulated voltage level and conductor 702 is ground. Conductor 703 is a clock input, conductor 704 is reset input, and conductor 705 is a bidirectional signal line. The microprocessor of smartcard device 407 includes three conductors 707–709 embedded in the dielectric body of the smartcard. These three conductors provide the clock, reset, and I/O conductors for the memory device 411. The memory device also includes five conductors 711–715 coupled to the memory device port 414. These conductors include power conductor 711, ground conductor 712, clock conductor 713, reset conductor 714, and I/O conductor 715 which communicate with the processor for a smartcard compatible device. Communication with the memory card compatible device is via port 414 is according to conventional memory card protocol, such that the smartcard device is invisible.

Figure 8:
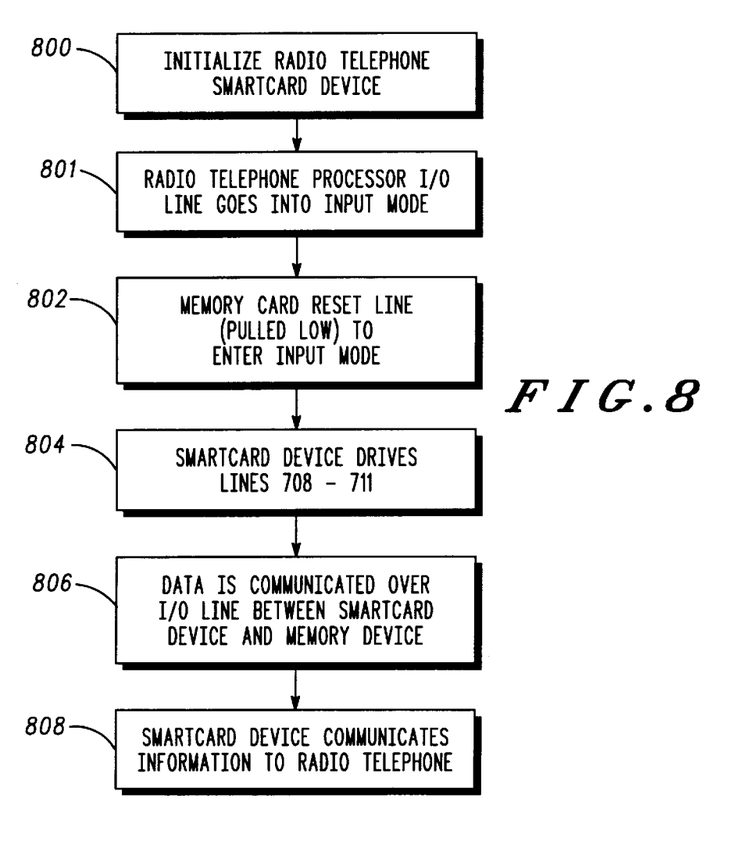
FIG. 8 is a flow chart illustrating use of the smart memory card in a cellular telephone.

Communication via port 408 (FIG. 5) will now be described. When the smart memory card 400 is inserted into the radio telephone 500, the radio telephone is initialized as indicated in block 800 (FIG. 8). Thus a subscriber identity is communicated to the radio telephone 500 according to the appropriate specification protocol, such as the GSM protocol in the case of GSM cellular telephones. The processor 402 communicates the identity stored in EEPROM 404 to fixed site 530 via processors 506 and 402, and ports 408 and 504. Processor 506 controls the I/O line 705 (FIG. 7) to go low, thereby initiating the input mode as indicated in block 801 (FIG. 8). The processor 402 (FIG. 7) then controls reset line 708 to go low as indicated in block 802 (FIG. 8). The smartcard device then communicates with the memory device via conductors 707–709 (FIG. 7) using memory device protocol as indicated in block 804 (FIG. 8). The memory device protocol may be stored in processor 402 of the smartcard device 407 (FIG. 7) or it may be stored in the processor 506 of the radio telephone 500. The processors 506 and 402 operate together to debit the account balance in memory 412 during the call. The fixed site 530 (FIG. 5) communicates charge rates to the processor 506. The processor decreases the account balance according to the costs of the call, including roaming charges, high and low rate times. Information communicated to the smartcard device 407 is communicated to the cellular telephone processor 506 as indicated in block 808.

It is envisioned that upon insertion of the smart memory card 400 (FIG. 5), the user can be given a choice between a debit call or an account call via a display and keypad in user interface 510. If the user does not have a cellular account, the card would contain a standard protocol indicating the same and allowing the user to employ a radio telephone, and the user would only be allowed to make a call which debits the memory device balance.

Additionally, if smart memory card 400 (FIG. 5) owner wishes to increase the account balance stored in the memory 412 when there is not a banking machine available, the user can increase the account balance via the radio telephone 500. The owner's cellular account would be billed for the increased amounts added to the debit card. The user could then use the new account balance stored in the smart memory card 400 with a memory card compatible device.

Memory 412 (FIG. 5) is larger than EEPROM 404. The larger size of memory 412, which can be implemented using an EEPROM, is available to increase the amount of user information available to the radio telephone 500. For example, telephone directories stored on the smart memory card can be made longer, to include more telephone numbers. The data stored in the EEPROM 404 and the memory 412 can be updated from the base site via the radio telephone. The memory 412 is available to increase the number of radio telephone features which may be programmed from the fixed site 530. The smartcard memory 412 stores the codes required to activate or deactivate a feature. The users account would be billed for the added features when they are added to the radio telephone.

Figure 9:
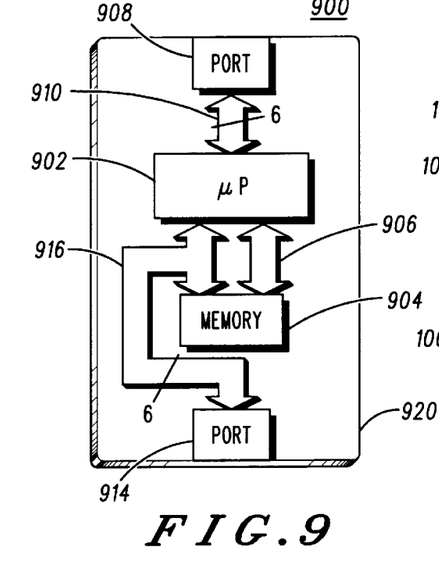
FIG. 9 is a schematic diagram of an alternate embodiment of the invention.

A smart memory card 900 is illustrated in FIG. 9. The smart memory card includes processor 902 coupled to memory 904 via data bus 906. The processor is also connected to port 908 via a data bus 910. A port 914 is coupled to memory 904 via data bus 916. The smart memory card 900 differs from smart memory card 400 in that a single memory is utilized for both the smartcard and the memory card. The memory 904 includes addresses accessible only by processor 902 for use in smartcard device operation. Memory 904 also includes addresses accessible to processor 902 and to a device connected to port 914 for memory card and smartcard device use.

Figure 10:
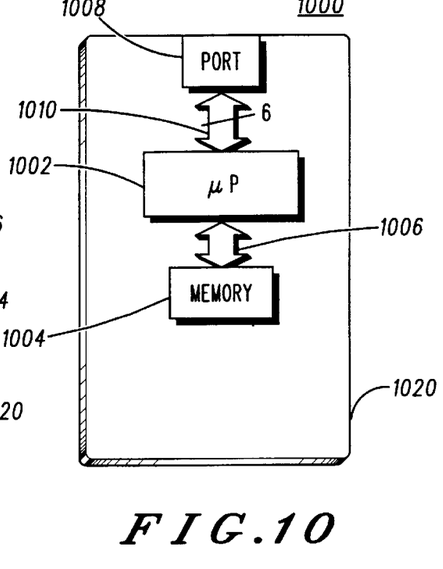
FIG. 10 is a schematic diagram of a smart memory card according to another alternate embodiment of the invention.

A smart memory card 1000 is illustrated in FIG. 10. Smart memory card 1000 includes processor 1002 connected to memory 1004 via data bus 1006. The processor is connected to port 1008 via a data bus 1010. Processor 1002 operates with memory 1004 to provide a smartcard implementation when a smartcard compatible device is connected to port 1008. Additionally, the processor is transparent to a memory card device connected to port 1008, such that the memory card device will operate as if it was connected directly to memory 1004.

Figure 11:
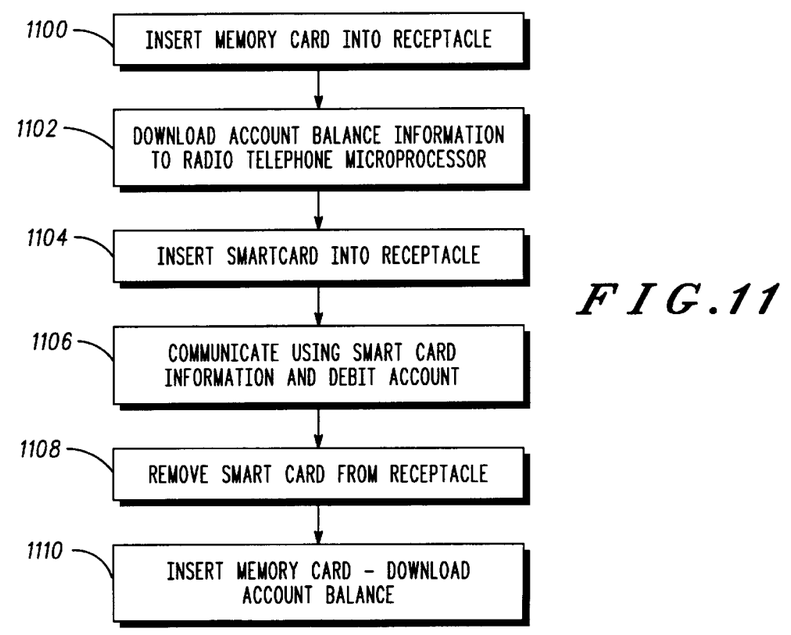
FIG. 11 is a flow chart illustrating a method of operating a memory card and a smartcard sequentially in a cellular telephone.

It is envisioned that processor 1002 can advantageously detect the type of device connected to port 1008. The processor looks for synchronous data and responds to this data to communicate synchronous data for a memory card device. The processor is configured to be transparent to the data from memory 1004 when the smart memory card is connected to such a device. If the processor 1002 detects asynchronous data, the processor communicates data for a smartcard compatible device, such as a cellar telephone. In this way, the card operates with either a smartcard compatible device coupled to port 1008 or a memory card compatible device coupled to port 1008. The radio telephone 500 (FIG. 5) can advantageously be programmed to receive a conventional memory card (such as 300 in FIG. 3) and a conventional smartcard (such as 100, 200 in FIGS. 1 and 2) sequentially to make a pay call from the radio telephone. This will be described with reference to FIGS. 1–3, 5 and 11. To provide a pay call from a radio telephone 500 (FIG. 5) the user would first insert the conventional memory card (such as 300 in FIG. 3) into receptacle 502, as indicated in block 1100 (FIG. 11), such that the smartcard port 302 is connected to radio telephone port 504. The processor 506 determines the type of device connected to port 504. After determining that the card is a memory card, the processor 506 downloads the account balance information from the memory card memory (300 in FIG. 3), as indicated in 1102. The information in the memory card can be reduced to zero at this time, in order to prevent fraudulent reuse while the account balance is stored in radio telephone 500. The user then retracts the memory card and inserts the conventional smartcard (such as 100 and 200 in FIGS. 1 and 2) into the receptacle 502, as indicated in block 1104. The processor is responsive to detecting the presence of the smartcard to place the radio telephone 500 in an active communication state. When the user makes a call, using the user interface 510, the radio telephone establishes a connection with fixed site 530 using the smartcard information, as indicated in block 1106. The fixed site communicates charge rates to the radio telephone processor 506. The processor 506 is responsive to the charge rates to debit the account during the call. When the user is finished with the call, the smartcard is removed from receptacle 502, as indicated in block 1108. When the memory card is inserted into the receptacle 502, the user's account balance is downloaded from the processor 506 to the smartcard.

Figure 12:
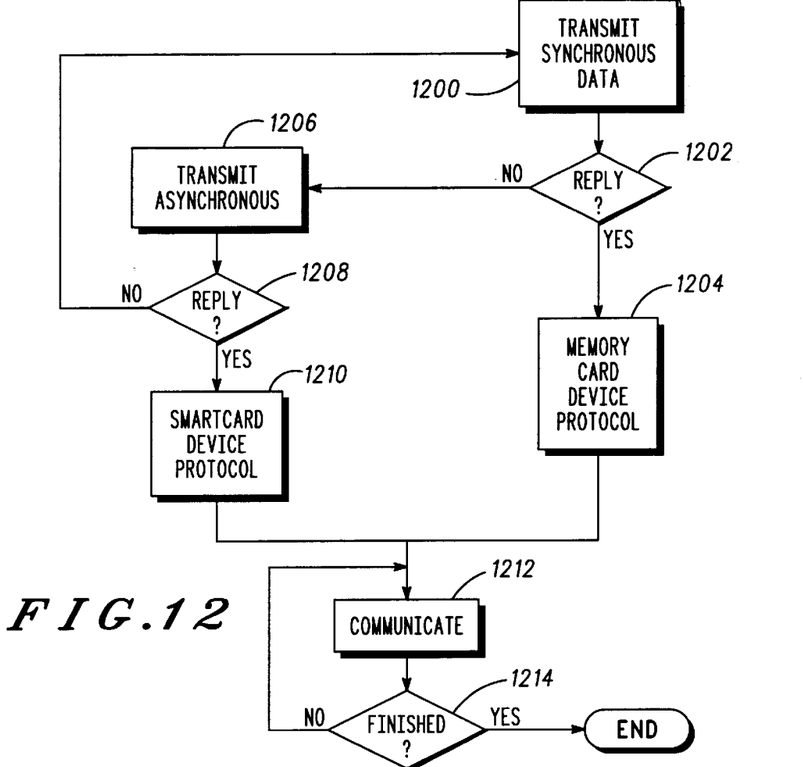
FIG. 12 is a flow chart illustrating detection of a synchronous or asynchronous device.

The processor 506 (FIG. 5) can preferably determine whether the card connected thereto is a smartcard or a memory card. To make this determination, synchronous data is communicated from processor 506 to processor 502 as indicated in block 1200 (FIG. 12). Following communication of the synchronous data, the processor 506 waits for a reply as indicated in block 1202. If there is a reply, the processor 506 uses the memory card protocol to communicate in a first mode with memory card, as indicated in block 1204. If no reply is detected in decision block 1202, the processor transmits asynchronous data as indicated in block 1206. If a reply is received, as determined at decision block 1208, the processor transmits signals according to a smartcard device protocol in a second mode, as indicated in block 1210. Following establishment of either of the protocols in blocks 1204 and 1210, the processor 506 communicates with the connected card as indicated in block 1212. When processor 506 determines that a call is finished at block 1214, the processor ends this routine. If it was determined in decision block 1208 that the asynchronous data did not achieve a response, the processor will return to block 1200.

Figure 13:
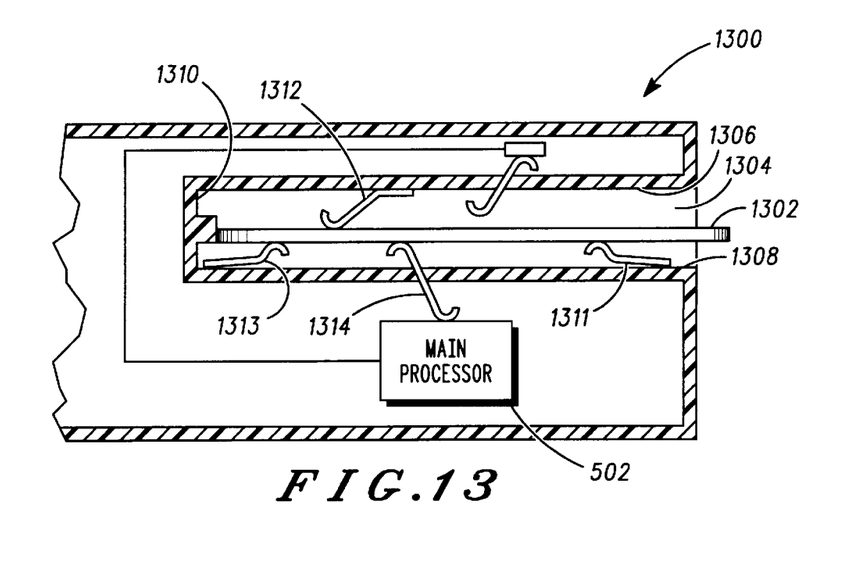
FIG. 13 is a schematic illustration of a cellular telephone receiving an information card.

FIG. 13 illustrates the insertion of an information card 1302 into the information card chamber, or receptacle, 1304 contained within the radio telephone 1300, according to another alternate embodiment of the invention. The receptacle 1304 has at least two platforms 1306 and 1308 containing transitional devices and electrical contacts as described in greater detail hereinbelow. In addition to these two platforms 1306, 1308, a third platform 1310 is located opposite the entrance to the receptacle 1304 to provide a positional stop for information cards inserted thereto. In the preferred embodiment, cantilevered springs were chosen for the transitional devices. However, other transitional devices, including inclined planes and torsional springs, can be used in a similar fashion and would still be considered to be within the scope of the invention disclosed herein.

FIG. 13 illustrates the position of the information card 1302 in the receptacle 1304 when the information card 1302 is properly inserted. During insertion, the card is moved past the first cantilevered spring 1311 to the second cantilevered springs 1312. The second cantilevered spring 1312 translates the information card 1302 towards the set of electrical contacts 1314 such that the information card 1302 essentially lands on top of the electrical contacts 1314 with only a short wiping, which wiping maintains a cleaning function that removes any oxidation on contacts 1314 or the contacts (not shown) on the information card 1302.

The spring constant of the second cantilevered springs 1312 is greater than the spring constant of the first cantilevered spring 1311 such that the second cantilevered spring 1312 overcomes the translation of the first cantilevered spring 1311. This difference in spring constants allows proper contact and pressure between the contacts of information card 1302 and the set of electrical contacts 1314 as required by GSM Specifications.

A third cantilevered spring 1313 is optional and is used to translate the first end of the information card 1302 so as to remove any moment created by the second cantilevered spring 1312 and the set of electrical contacts 1314. In the preferred embodiment, the spring constant of the third cantilevered spring 1313 would be less than that of the second cantilevered spring 1312.

When the information card 1302 is properly inserted as illustrated in FIG. 13, the electrical contacts of the information card 1302 rest with the appropriate amount of pressure on the set of electrical contacts 1314. This electrical connection couples the main processor 506 to the information card 1302 allowing data to be written to or read from the information card 1302 by the processor 506. The card 1302 can be a memory card 300 (FIG. 3) or a smartcard 100 (FIG. 1) or 200 (FIG. 2). Preferably, the processor 506 connected to contacts 1314 can determine the type of card connected thereto, in the manner described above with respect to FIG. 12.

Figure 14:
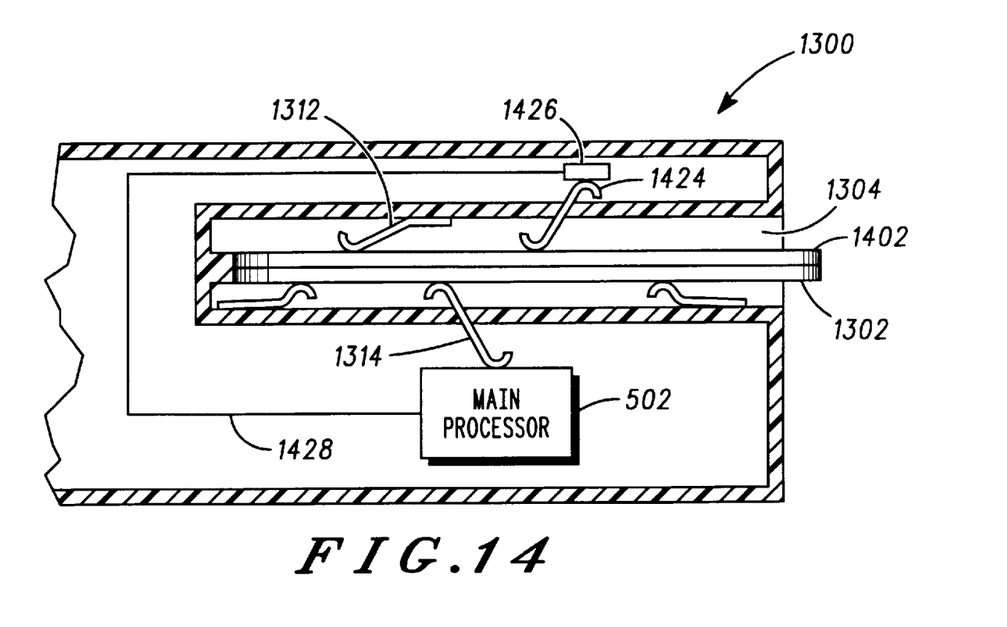
FIG. 14 is a schematic illustration of a cellular telephone receiving two information cards.

The receptacle 1304 is sufficiently large to receive a second information card 1402, as illustrated in FIG. 14. The second information card is inserted in juxtaposition with the first information card 1302. When fully inserted, the second cantilevered spring 1312 is pressed upwardly. Contacts 1424 provide a short wiping contact with contacts (not shown) on information card 1402. Contacts 1424 are connected to terminals 1426 of signal bus 1428. Signal bus 1428 is connected to main processor 506. The second cantilevered spring 1312 preferably exerts a smaller force against card 1402 when the second card is inserted than it exerted against card 1302 alone. additionally, the force exerted by contacts 1424 plus the force exerted by cantilevered spring 1312 is preferably equal to the force exerted on card 1302 alone, as illustrated in FIG. 13. The second card 1402 preferably exerts a force against contacts 1424 equal to that exerted by contacts 1314 against card 1302. Accordingly, both contacts have a force to make reliable contact with the cards.

The processor 506 communicates with information card 1402 via contacts 1424, terminals 1426, and bus 1428. Processor 506 preferably includes circuitry for determining the type of card connected to contacts 1424 using the method illustrated above with respect to FIG. 12. Most preferably, the main processor will communicate with a smartcard and a memory card of conventional structure, regardless of which card type is connected to contacts 1424 and 1314. It is noted, that one of these cards is a conventional memory card and the other card is a conventional smartcard. During a telephone call, the main processor 506 receives information required for GSM communication from the one of cards 1302, 1402 which is a smartcard and receives account information from the other of cards 1302, 1402 which is a memory card. The account information is credited and debited in the same manner as described above with respect to the smart memory card. Thus a pay call can be made from a radio telephone by inserting a conventional smartcard and memory card into the novel radio telephone. The cellular telephone can also be used to increase the account balance in the pay phone by debiting the users cellular account in the manner described above with respect to the smartcard.

Figure 15:
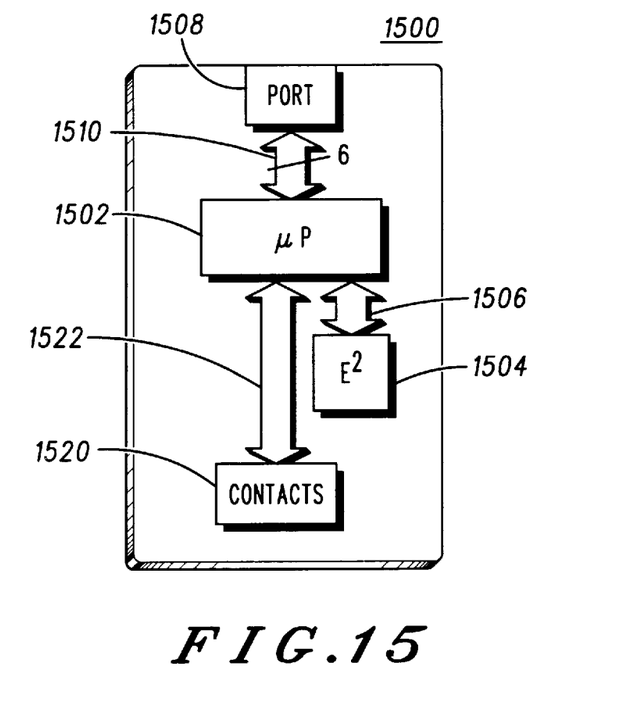
FIG. 15 is a schematic illustration of another smart memory card.

A smartcard 1500 (FIG. 15) includes processor 1502 connected to an EEPROM 1504 via data bus 1506 and port 1508 via data bus 1510. The smartcard additionally includes spring contacts 1520 connected to processor 1502 via data bus 1522. The contacts 1520 are adapted to contact the port of a conventional memory card (such as 300) when positioned in juxtaposition therewith.

Figure 16:
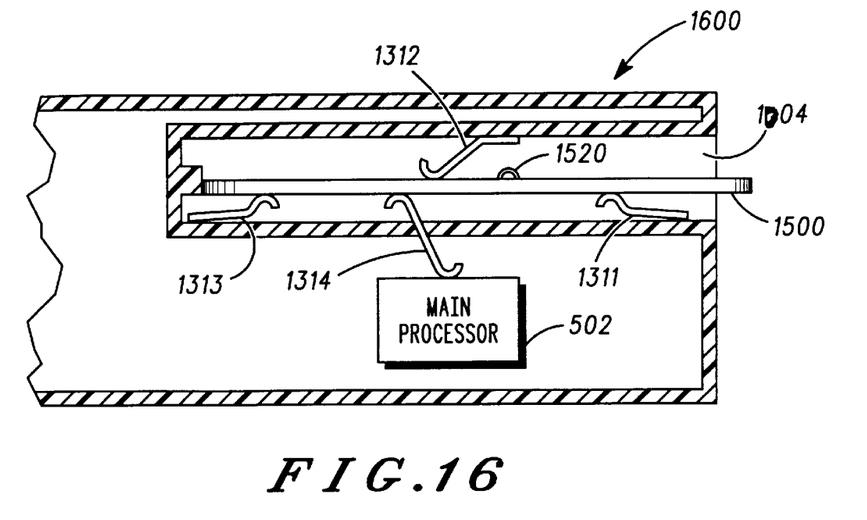
FIG. 16 is a schematic illustration of another cellular telephone receiving an information card.

Smartcard 1500 may be used with a cellular telephone 1600 alone, as illustrated in FIG. 16. The cantilevered springs 1311, 1312, and 1313 in receptacle 1304 exert forces upon the smartcard 1500 such that the contacts associated with smartcard 1500 make reliable connection with contacts 1314, for communication with the main processor 506. The smartcard is utilized alone to provide smartcard operation in a conventional manner.

Figure 17:
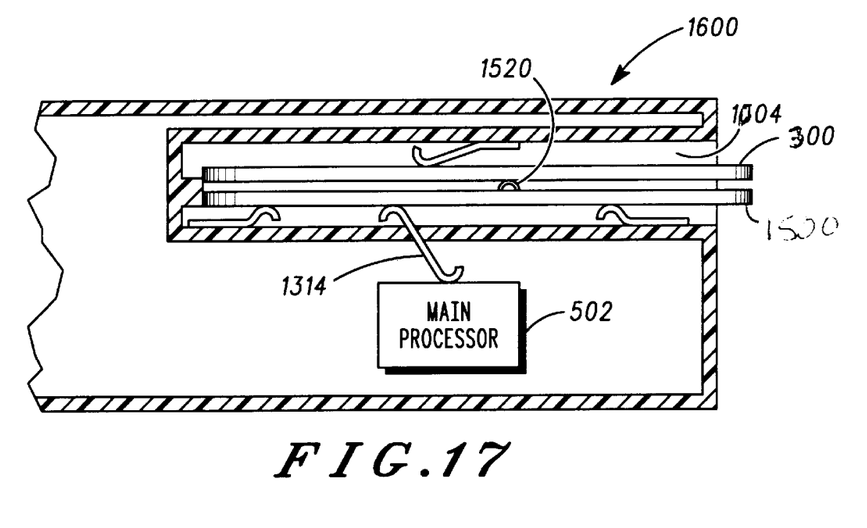
FIG. 17 is a schematic illustration of a cellular telephone receiving two information cards.

The smartcard 1500 is used in combination with a memory card 300, when the memory card is inserted in juxtaposition therewith, as illustrated in FIG. 17. When the second card is inserted into the receptacle 1604 as illustrated in FIG. 17, the spring contacts 1520 make a wiping contact with contacts on memory card 300. This creates an electrical connection between the memory card 300 and the main processor of the cellular telephone via contacts 1520 (FIG. 15), data bus 1522, processor 1502, data bus 1510, and port 1508. In this manner, the smartcard 1500 is used to establish a memory card call using memory card 300 through the smartcard 1500 and a single set of contacts 1314 in a cellular telephone.

Although not specifically described herein, it is envisioned that a smart card memory could be provided which includes a smartcard device and a memory card device which are not interconnected. The smartcard device and the memory card device would operate independently. A cellular telephone, including two ports associated with a receptacle, can receive the card and communicate with both ports as required to carry out a pay call using the smartcard device information and the memory card device information.

Thus, it can be seen that an improved smartcard is disclosed which facilitates the use of a debit card in a cellular telephone. Additionally, the smart memory cards are more versatile than those utilized heretofore. More versatile devices for use with information cards are also disclosed.

We claim:

1. A smart memory card, comprising:

a body;

a smart card device including a processor positioned in the body and a first memory positioned in the body, the first memory storing a subscriber identity used by a cellular telephone to provide subscriber information to access a cellular system; and a memory card device positioned in the body, the memory card device coupled to the smart card device, the processor accesses the memory card device to make a pay call through a cellular telephone using the subscriber identity and debits the memory card device when the smart memory card is connected to a cellular telephone and the memory card device is debited to make a call without the subscriber identity when the smart memory card is connected to a memory card compatible device.

2. The smart memory card as defined in claim 1, wherein the memory card device includes a second memory.

3. The smart memory card as defined in claim 2, wherein the smartcard device memory includes an electronically programmable read only memory.

4. The smart memory card as defined in claim 1, wherein the processor is coupled to the memory card device.

5. The smart memory card as defined in claim 1, wherein the smart card device includes a single port and the processor determines whether the port is connected to cellular telephone or a memory card device.

6. The smart memory card as defined in claim 5, further including first and second ports, wherein the processor is connected between the first memory and the second port and the second memory is connected between the processor and the first port.

7. A smart memory card comprising:

a body;

a smart card device positioned in the body and including a first port to couple to a cellular telephone, a processor coupled to the first port through a first bus, a first memory coupled to the processor through a second bus, the processor storing a subscriber identification number; and a memory card device positioned in the body and including, a second port to couple to a memory card compatible device;

a second memory coupled to the second port through the second bus and to the processor through a third bus, the second memory storing a balance;

whereby the second port is coupled to a memory card compatible device to carry out memory card operations and the first port is coupled to a cellular telephone to make a cellular telephone call using the smart card device and the memory card device.

* * * * *